US006542014B1

(12) United States Patent
Saito

(10) Patent No.: US 6,542,014 B1
(45) Date of Patent: Apr. 1, 2003

(54) THERMAL NOISE RANDOM PULSE GENERATOR AND RANDOM NUMBER GENERATOR

(75) Inventor: Takeshi Saito, Shinkou (JP)

(73) Assignee: Leisure Electronics Technology (JP)

( * ) Notice: Subject to any disclaimer, the term of this patent is extended or adjusted under 35 U.S.C. 154(b) by 0 days.

(21) Appl. No.: 09/830,927

(22) PCT Filed: Nov. 26, 1999

(86) PCT No.: PCT/JP99/06608

§ 371 (c)(1),
(2), (4) Date: May 2, 2001

(87) PCT Pub. No.: WO01/33333

PCT Pub. Date: May 10, 2001

(30) Foreign Application Priority Data

Nov. 2, 1999 (JP) .......................... 11-311785

(51) Int. Cl.[7] ................................. H03K 3/84
(52) U.S. Cl. ..................... 327/164; 327/172; 331/78
(58) Field of Search ................. 327/164, 172, 327/184, 187, 189, 291, 299; 331/78; 703/3, 250

(56) References Cited

U.S. PATENT DOCUMENTS 3,675,148 A * 7/1972 Edwards ................... 331/78
3,816,765 A * 6/1974 Goyer ...................... 331/78
4,183,088 A * 1/1980 Simmons ................. 364/717
5,506,545 A * 4/1996 Andrea ..................... 331/78
6,118,567 A * 9/2000 Alamed et al. ........... 359/189
6,195,669 B1 * 2/2001 Onodera et al. ............ 708/3

* cited by examiner

Primary Examiner—Timothy P. Callahan
Assistant Examiner—An T. Luu
(74) Attorney, Agent, or Firm—Cislo & Thomas LLP

(57) ABSTRACT

A random number generator has a simple configuration using know inexpensive electronic parts and can generate the true physical random numbers at a required generation speed. Such a random number generator can provide the true physical random numbers to any sectors of society at dramatically low cost A random pulse generator comprises a thermal noise generating element (2) having a resistor, a conductor or a semiconductor such as a diode adapted to generate thermal noises Hen no electric current is supplied to them, an analog-amplifier circuit for amplifying the irregular potential generated from the thermal noise generating element and a waveform shaping circuit (6) adapted to take out the output of the amplifier circuit as random rectangular pulse signals. A thermal noise random number generator comprises, in addition to the above components, an n-bit counter (n being an integer) for measuring the time interval between a random pulse signal output from the waveform shaping circuit (6) and the immediately succeeding random pulse signal and is adapted to output the count of the n-bit counter as natural random number.

7 Claims, 12 Drawing Sheets

US 6,542,014 B1

THERMAL NOISE RANDOM PULSE GENERATOR AND RANDOM NUMBER GENERATOR

TECHNICAL FIELD

This invention relates to a physical random number generator adapted to generate the true random numbers by taking out thermal noises generated from a thermal noise generating element such as a resistor or a diode Men no electric current is supplied to the thermal noise generating element and amplifying it by means of an amplifier. A physical random number generator according to the invention can suitably be used for personal identification, coding and other purposes in computer telecommunications and mail-order business because it can perfectly eliminate frauds. A physical random number generator according to the invention is also suitable for generating the probability in various game machines.

BACKGROUND ART

Known physical random number generating methods include those for generating random numbers by detecting a random phenomenon of nuclear decay as disclosed in Japanese Patent Applications Laid-Open Nos. 11-161473 and 11-184676 filed by the inventor of the present invention and those for generating random numbers by detecting the light of a light-emitting diode as disclosed in Japanese Patent Application Laid-Open No. 11-145362 also filed by the inventor of the present invention.

A number of random number generators designed to supply an electric current to a resistor and utilize thermal noises from the resistor have been invented and are described in text books on recording mediums.

While a physical random number generator that utilizes the decay products of a radioactive source provides the advantage that it can easily generate the true random numbers, it is accompanied by a number of disadvantages including that it involves a complex manufacturing process and high manufacturing cost because of the use of a radioactive source and that a device with radioactive source has difficulty to be socially accepted because of the regulation of radioactivity and environmental assessment in the use of radioactive substances.

A physical random number generator adapted to generate random numbers by detecting the light from a light emitting diode (LED) by means of a photodiode is advantageous in tat it can generate the true random numbers at relatively low cost However, such a physical random number generator needs new technological developments for integrally forming a LED and a photodiode as a compact unit.

It is impossible to enclose a known random number generators designed to supply an electric current to a resistor in order to utilize it as thermal noise source in a portable card or an integrated circuit (IC) because it requires the use of specifically designed devices including a piece of hardware for generating random numbers and a processing circuit for removing the 1/f noise that are generated as a result of supplying an electric current to the noise source.

Therefore, it is the object in the present invention to provide a random number generator that has a simple configuration with known inexpensive electronic parts and can generate the true physical random numbers at a required generation speed. Such a random number generator can provide the true physical random numbers to any industrial fields at dramatically low cost

DISCLOSURE OF INVENTION

The present invention is based on the fact that noises generated from a generating thermal noise element such as a resistor or a diode when no electric current is supplying to it are pure thermal noises that do not contain the so-called 1/f noise that is inversely proportional to the frequency f, and that the pure thermal noises represent a perfect random phenomenon. According to the invention, there is provided a random pulse generator that utilizes the above phenomenon and is adapted to amplify thermal noises by means of an amplifier to produce random analog pulse signals, transform the analog pulses into rectangular pulses and taking out the rectangular pulses for use. Thus, a random pulse generator according to the invention supplies random pulse signals that can be used for generating the natural random numbers.

In the second aspect of the invention, random pulses generated from a random pulse generator according to the invention are taken out as pulse signals and the time intervals between the random pulse signals and the succeeding pulse signals that are generated immediately after the respective first random pulse signals are measured and the measured values are supplied as the true physical random numbers. In case of time measurement with a n-bit counter, this invention use the measured value of the n bit number (n: integer, e.g., 8-bits: 0–255) as the true physical random numbers.

In the third aspect of the invention, the number of random pulses within a predetermined time period generated by a random pulse generator according to the invention are counted and one digit number or several-digits number of the counted relative frequency values are supplied as the true physical random numbers.

In the fourth aspect of the invention, random pulses generated by a random pulse generator according to the invention are taken out as pulse signals and the pulse frequencies within a predetermined time period or the time intervals between the random pulse signals and the succeeding pulse signals that are generated immediately after the respective first random pulse signals are measured so that the pulse peak value of one of the measured random pulse signals is selected as threshold value of a pulse peak discriminator in order to generate the true random numbers at a required random number generating speed In the fifth aspect of the invention, a thermal noise generating element such as a resistor or a diode and other electronic circuits are contained integrally in an IC card or an IC chip provided with an information processing circuit and the information processing circuit are fed with physical random numbers for the purpose of personal identification, encoding and other purposes in computer telecommunications or mail-order business or for using it as a probability generator in a game machine.

THE BEST MODE FOR CARRYING OUT THE INVENTION

It is well known that a variety of noises are generated from a semiconductor, a conductor or a resistor when an electric current is supplied to them. These noises include thermal noises generated as a result of thermal motions of carriers and/or conduction electrons, so-called 1/f noises that are considered to be related to the surface condition and the electrical contacts between parts, current noises that are generated when an electric current is supplied to them (1/f noises) and shot noises that are generated due to fluctuations that arise due to the fact that the number of carriers and/or electrons is finite. According to the invention, the true random numbers are generated by utilizing the perfectly random phenomenon that are obtained by amplifying the pure thermal noises that arise when no electric current is supplied to a resistor, a semiconductor or a diode.

The square means value $<V^2>$ of the voltages produced by thermal noises is given by the formula below:

$$<V^2>=4kRTB \qquad \text{(formula 1),}$$

where "R" is the resistance value, "k" is the Boltzmann's constant, "T" is the absolute temperature of the resistor and "B" is the frequency bandwidth.

According to the invention, no electric current is supplied to resistor and the thermal noises from the resistor as expressed by formula 1 above are amplified and used as random pulse signals, which are then utilized to generate the true random numbers.

Now, the present invention will be described in detail by referring to the accompanying drawings that illustrate preferred embodiments of the invention.

Figure 1:
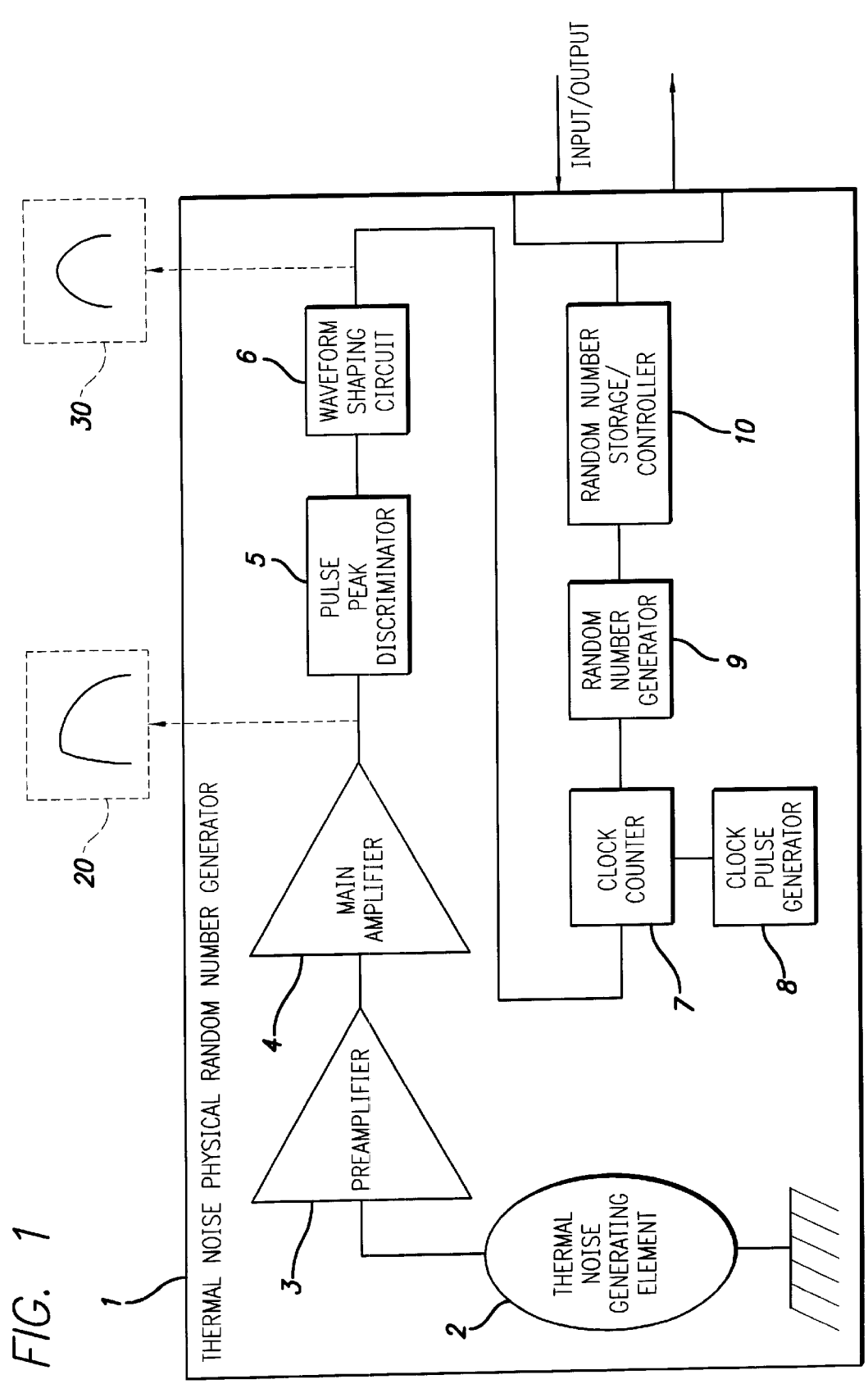
FIG. 1 is a schematic diagram of an embodiment of thermal noise physical random number generator according to the invention, showing its overall configuration.

FIG. 1 is a schematic diagram of an embodiment of thermal noise physical random number generator according to the invention, showing its overall configuration. Referring to FIG. 1, the thermal noise physical random number generator 1 composes a thermal noise generating element 2 that is any of a resistor, a conductor, a semiconductor element or a diode, a preamplifier 3 connected to one of the terminals of the thermal noise generating element 2, a main amplifier 4, a pulse peak discriminator 5 for selecting pulse peak of analog pulses amplified by the amplifiers higher than a threshold value, a waveform shaping circuit 6 for shaping the selected pulses into rectangular waveforms, a clock pulse generator 8 for generating clock pulses in order to measure the time between the rectangular pulse to the rising edge of the immediately succeeding rectangular pulse, a clock counter 7 for counting the number of clock pulses fed from the clock pulse generator 8 on the basis of n bits (e.g., 8 bits: 256, 10 bits: 1024, etc., n being an integer), a random number generator 9 adapted to read the count value of the clock counter 7, a random number storage/controller 10 for storing the random numbers of the random number generator 9.

When a diode is selected as the thermal noise generating element 2, any type of semiconductor is acceptable. Therefore, an analog switch might be a good selection because it is commercially available and it is incorporated easily into an integrated circuit. When, on the other hand, a resistor is used, a large resistance value which to generate larger thermal noises than the noises generated by the preamplifier 3 should be selected in order to remove the 1/f noises from the amplifier 3.

The thermal noise generating element 2 and all the other circuits may be integrally combined and contained in an IC card or an IC chip. The operation of the embodiment will be explained below.

The thermal noises produced from the thermal noise generating element 2 without supplying any electric current are amplified and transformed into analog pulse signals by the preamplifier 3. The analog pulse signals amplified by the preamplifier 3 are boosted into voltage signals of several volts for easy detection by the main amplifier 4. Pulse signals with pulse peak beyond a given pulse peak value are selected by the pulse peak discriminator 5 out of the voltage signals from the main amplifier 4 and then shaped into rectangular pulse signals by the waveform shaping circuit As the time intervals between the shaped rectangular pulses are random, and whose frequency distribution is expotential. Thus the time intervals are counted with the time counter 7 that is an n-bit counter (n: integer, e.g., 8-bit counter) by number of clock pulses from the pulse generator 8 with frequency of several MHz and the final count number is used as natural random numbers. Then, the random numbers are taken out by the random number generator 9 are stored in the random number storage/controller 10. The storage random number are taken out from the random number storage/controller 10 on external demand.

Figure 2:
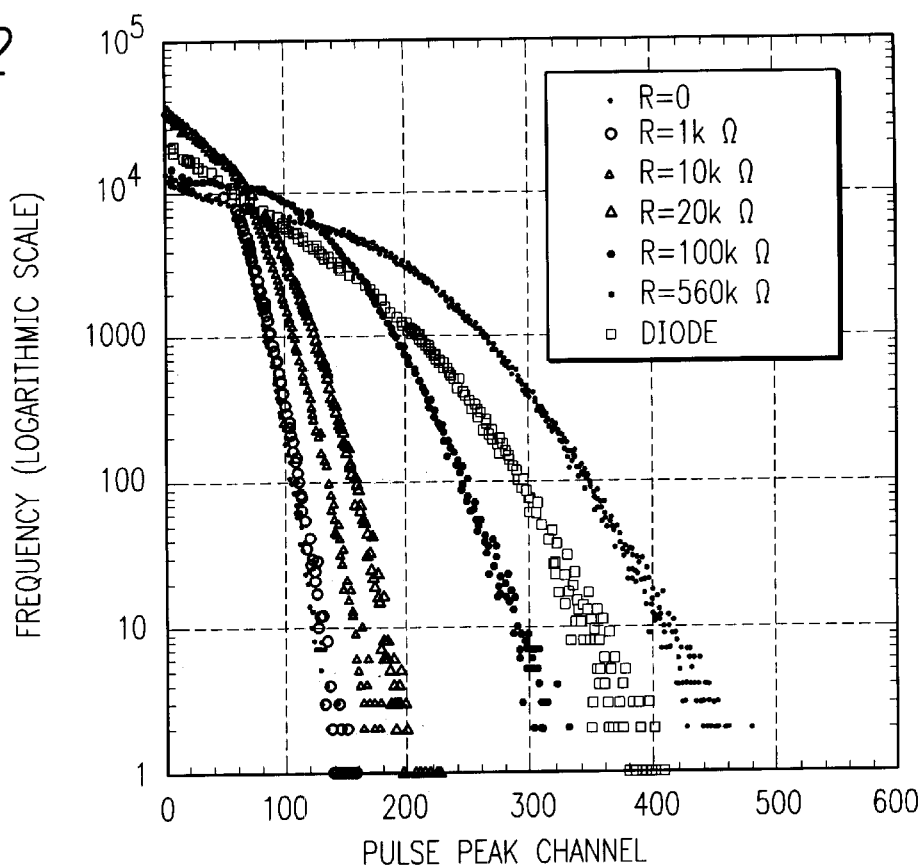
FIG. 2 is a graph showing the pulse peak distribution between the pulse peak value and the relative frequency obtained in an experiment for various different resistance values of the resistor fitted to the thermal noise generating element of the embodiment of the embodiment of FIG. 1.

FIG. 2 is a graph showing the observed pulse peak distribution obtained by analyzing the analog pulse signals of the thermal noises amplified by the preamplifier 3 and the main amplifier 4 by means of a pulse peak analyzer 20, using resistors with different resistance values $R_s$ ($R_s$=0, 1 kΩ, 10 kΩ, 20 kΩ, 100 kΩ, 560 kΩ) or a diode fitted as the thermal noise generating element 2 of the embodiment of the embodiment of FIG. 1. As shown in FIG. 2, in case of resistance value of resistor is less than 1 kΩ the thermal noise level from the resistor becomes substantially same as the noise level of the preamplifier 3. Since the voltage due to thermal noise is proportional to the square root ($\sqrt{R}$) of the resistance value R of the resistor, the pulse peak value distribution of the thermal noises of the resistor is found to be sufficiently larger than that of the noises of the preamplifier 3 when a resistance value of more than 100 kΩ is selected for the resistor as seen from FIG. 2.

Figure 3:
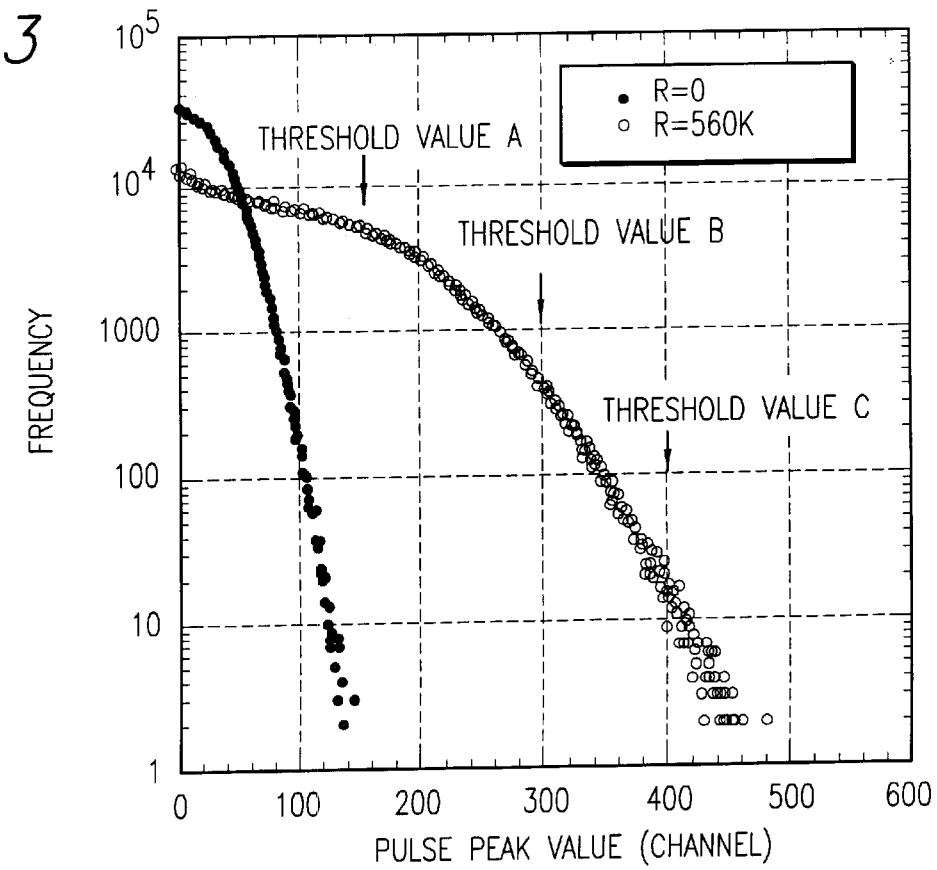
FIG. 3 is a graph showing the pulse peak distribution of the random pulses generated by amplifying the thermal noises from the resistor of a resistance of 560kΩ in the embodiment of FIG. 1 showing as obtained in an experiment.

FIG. 3 is a graph showing the pulse peak value distribution of the thermal noises obtained when a resistor with a resistance value $R_s$=0 or 560 kΩ is used as the thermal noise generating element 2. Any desired number of pulses per second can be produced by selecting an appropriate threshold value of the pulse peak discriminator 5 as indicated by arrows of threshold value A, threshold value B and threshold value C in FIG. 3 as so many examples. If, for instance, pulse signals of about 7,650 per second are generated when the value of arrow A is selected as threshold. Similarly, about 2,800 pulse signals per second are generated when the value of allow B is selected as threshold, and about 160 pulse signals per second are generated when the value of arrow C is selected as threshold.

Figure 4:
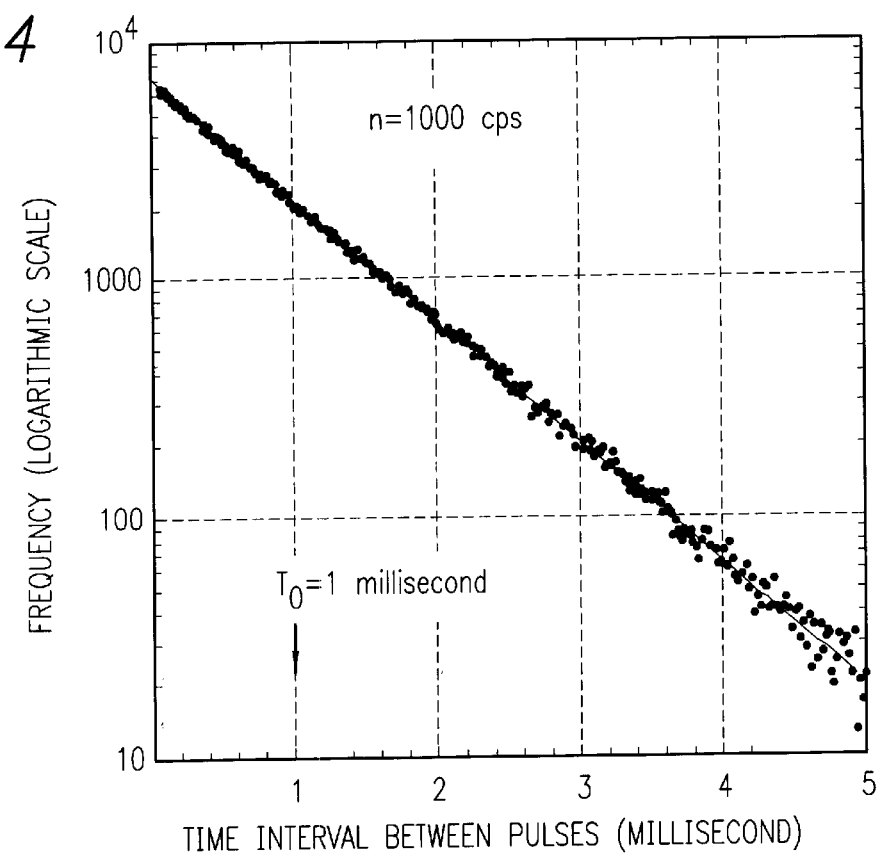
FIG. 4 is a graph showing that the observed frequency distribution of the time intervals between the random pulse signals generated by amplifying the thermal noises from the resistor of the embodiment of FIG. 1 and the succeeding pulse signals that are generated immediately after the respective first random pulse signal is expressed as an exponential distribution.

The time interval "t" between a pulse signal output from the wave shaping circuit 6 and the pulse signal immediately succeeding the preceding pulse signal is measured by using clock pulses generated by the clock pulse generator 8 and the clock counter 7. The time interval "t" is expressed in terms of number of clock pulses. FIG. 4 shows the observed frequency distribution of time interval "t" in the case of generation speed of 1,000 pulse signals per second that are outputs from the wave shaping circuit 6.

As shown in the FIG. 4, the experimental values indicated by the black dots is expressed by an exponential distribution formula exp. ($-t/T_0$) shown by the solid line, where $T_0$ is the average value of the time intervals "t" and $T_0$=(1/n)=(1/1,000)=1 millisecond. An arrow in FIG. 4 indicates the average value of 1 millisecond. The fact that the frequency distribution of time intervals of the pulse signals obtained by amplifying the thermal noises from a resistor is expressed by an exponential distribution indicates that the observed noises represent a random phenomenon that shows a Poisson distribution. This fact guarantees that it is justifiable to use the measured value of the time interval of the thermal noise.

When the clock frequency of the clock pulse generator 8 used for measuring the time interval "t" is F Hz, the unit of time measurement is (1/F) seconds. In other words, the time interval "t" is expressed in terms of number of unit time of (1/F). In the measurement of the time interval "t" by means of an 8-bit (256) counter, and when the count value exceeds 256, that is the time interval is "t">(256/F), a counting starting from 1 and ending at 256 is repeated and the residue is used as count value. Thus, if the count of the time interval "t" is 2,000, for example, the count value and the random number is 208 because formula "2,000=256×7+208".

Figure 5:
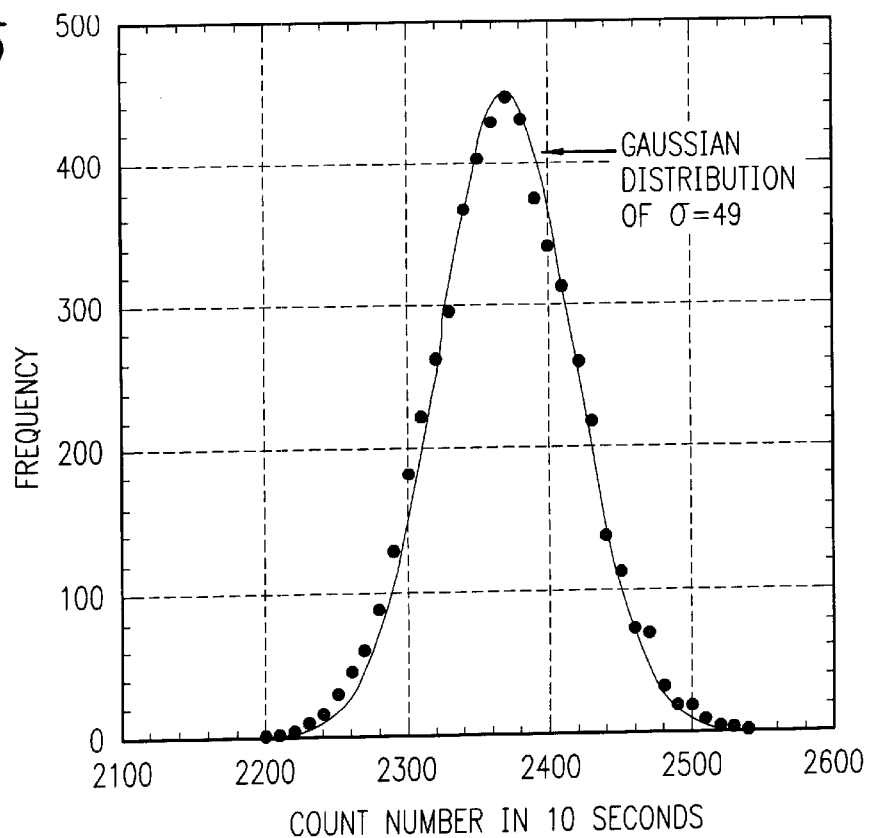
FIG. 5 is a graph showing the observed frequency distribution of the number of random pulse per 10 seconds generated by amplifying the thermal noises from the resistor of the embodiment of FIG. 1.

FIG. 5 is a graph of the observed frequency distribution of the number of pulse signals when the threshold value in the pulse peak distribution graph of FIG. 3 is fixed so as to make the generation rate of pulse signals to be equal to 237 per second.

More specifically, the frequency distribution graph of FIG. 5 is obtained by counting the number of pulse signals per 10 seconds for 2,000 times.

The average count value (the peak count) of FIG. 5 is 2,370 (or 237 per second). Then, the standard deviation a is given by σ=√(2370)=49. A Gaussian distribution curve having σ value of 49 is also shown by the broken line curve in FIG. 5. The fact that the frequency dribution of generation rate of thermal noises from a resistor is a Gaussian distribution certifies that thermal noises from the resistor represent a random phenomenon and hence the thermal noises can be used as random numbers.

Figure 6:
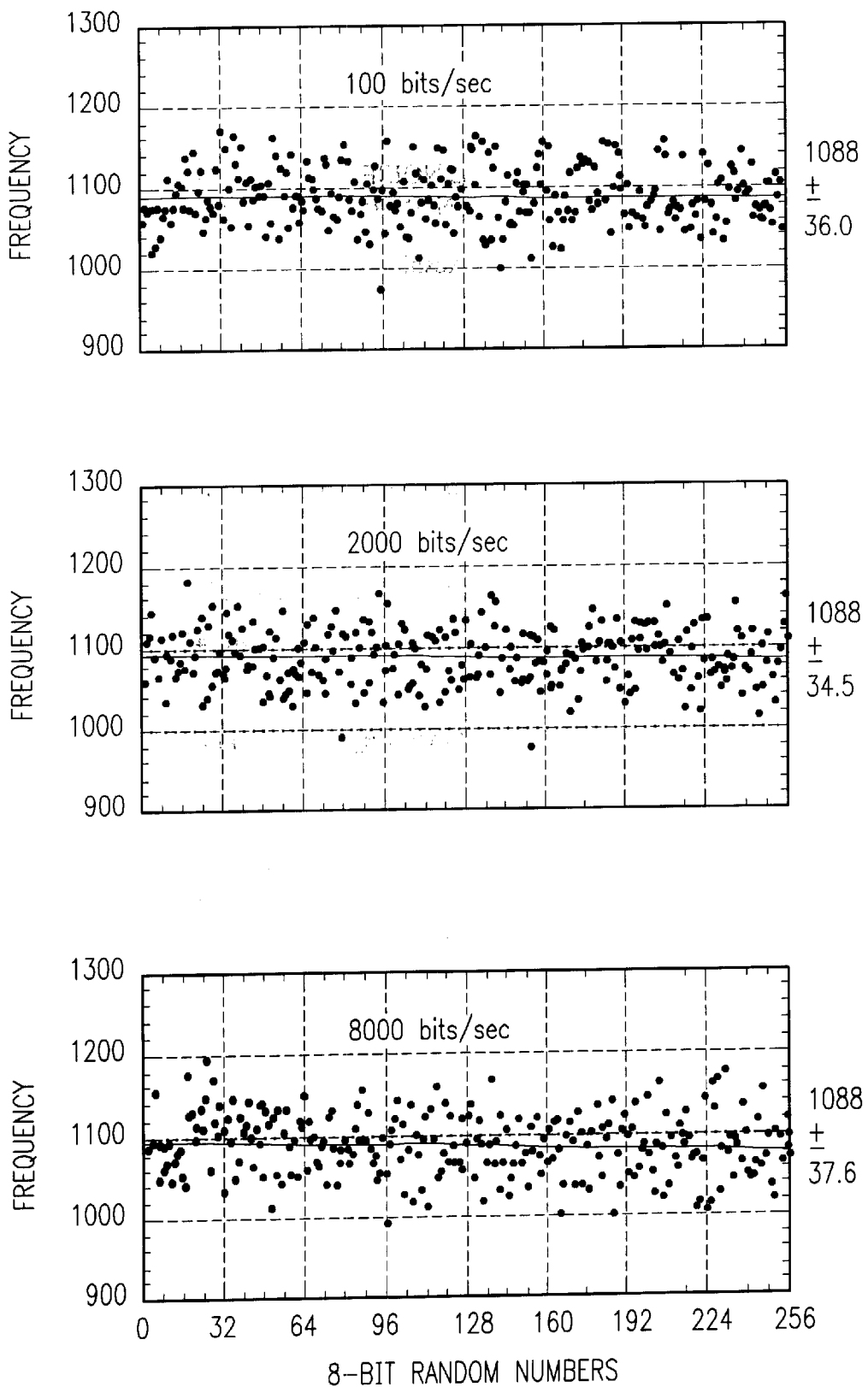
FIG. 6 is a graph showing the observed distribution of 8-bit random numbers in the embodiment of FIG. 1, where the clock frequency for measuring the time intervals of random pulse signals is fixed to 11.25 MHz and the random number generating speed n per second is changed to be equal to 100 bits, 2,000 bits and 8,000 bits.

FIG. 6 is a graph of the observed frequency distribution of the 8-bit random numbers obtained by measuring the time interval "t" by means of a clock having a clock frequency of 11.25 MHz. In the case of FIG. 6, the generation rate of pulse signals is varied from 100 bits per second (12.5 counts per second) to 8,000 bits per second (1,000 counts per second) by using different threshold values for the pulse peak discriminator 5, while fixing the clock frequency to 11.25 MHz. As clearly seen in FIG. 6, the frequency distribution of random numbers remains substantially uniform even if the generation of pulse signals is varied remarkably (to a ratio of 80:1).

The voltage produced by the thermal noises from a resistor is proportional to the root of the temperature T of the resistor ($\sqrt{T}$) as indicated by formula 1 above. In other words, even if the ambient temperature changes from −60° C. (213K) to +40° C. (313K), the voltage value changes only by about 20%. Thus, as shown in FIG. 6, the influence of the temperature change can be ignored.

A portable physical random number generator that can generate the true random numbers at a desired generation speed is fitted to an IC card or a circuit board of a computer or some other device for encoding in computer telecommunications and for the purpose of personal identification in mail order business and other commercial transactions. Such a physical random number generator is also used as probability generator that can eliminate frauds.

Figure 7:
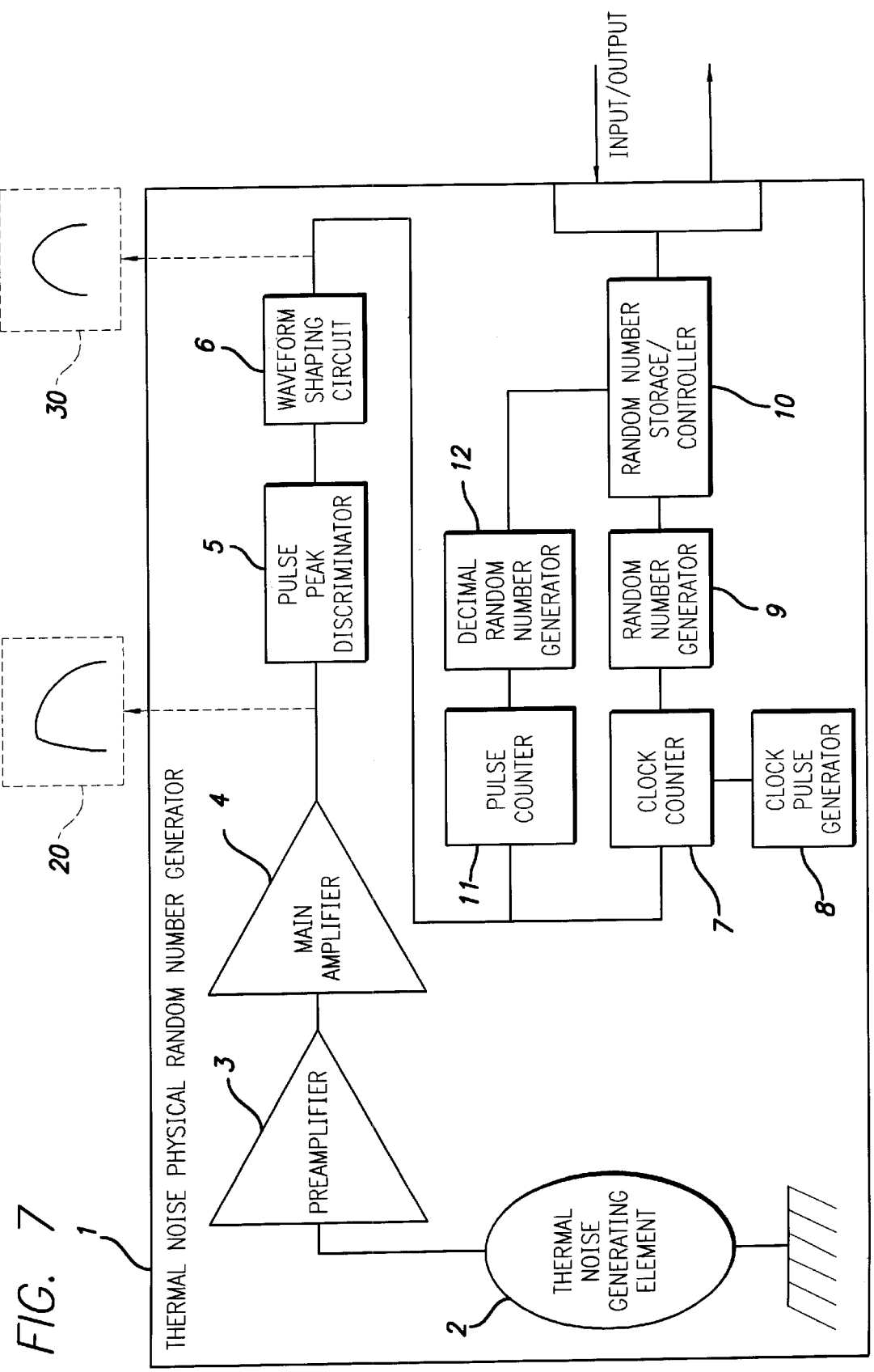
FIG. 7 is a schematic circuit diagram of the second embodiment of the invention.

FIG. 7 is a schematic circuit diagram of the second embodiment of the invention that is adapted to generate random numbers by counting the number of pulses in a predetermined time period. It comprises a thermal noise generating element 2, a preamplifier 3, a main amplifier 4, a pulse peak discriminator 5 and a waveform shaping circuit 6, which are same as their counterparts of the embodiment of FIG. 1 and hence will not be described any further. This embodiment additionally comprises a pulse counter 11 for counting the number of pulses in a fixed time interval, a decimal random number generator 12 adapted to take out the one-digit number or the several digits number as random number of the count value of the pulse counter 11 and a random number storage/controller 10 for storing the random numbers generated by the random number generator 12.

The one digit number or the several digits number of the number of pulses per unit time counted by the pulse counter 11 is used as random number. The following description concerns the case of one-digit number as random number.

Figure 8:
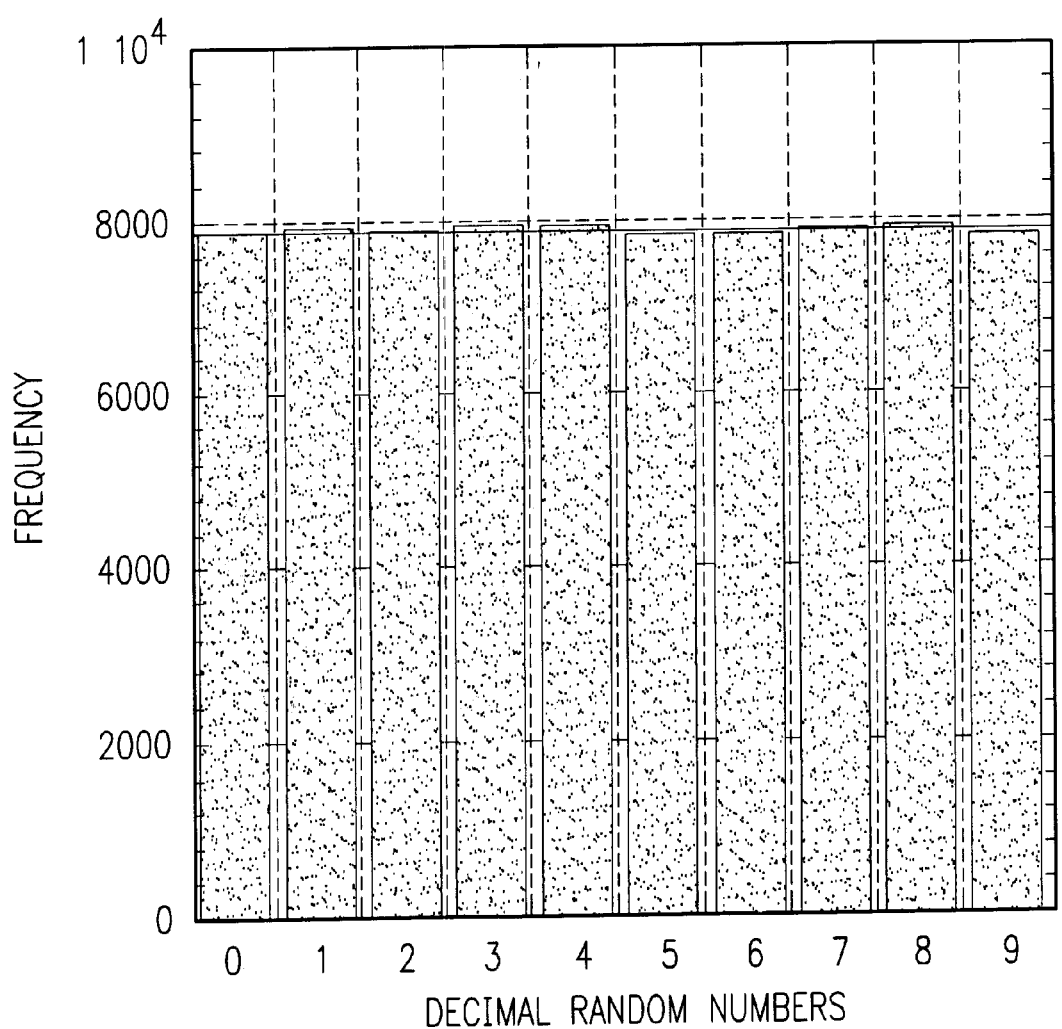
FIG. 8 is a bar graph, showing the relationship between the decimal random numbers and the relative frequency of appearance in the embodiment of FIG. 7.
Figure 9A:
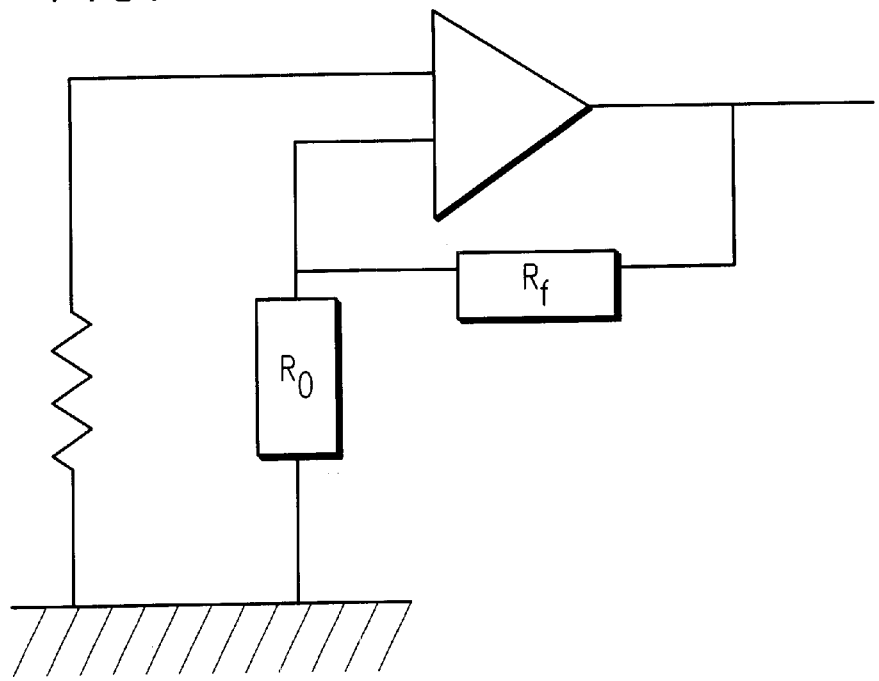
FIG. 9A is a circuit diagram of a thermal noise element in the form of a resistor having a resistance value of $R_s$ and a noninverting amplifier connected thereto.
Figure 9B:
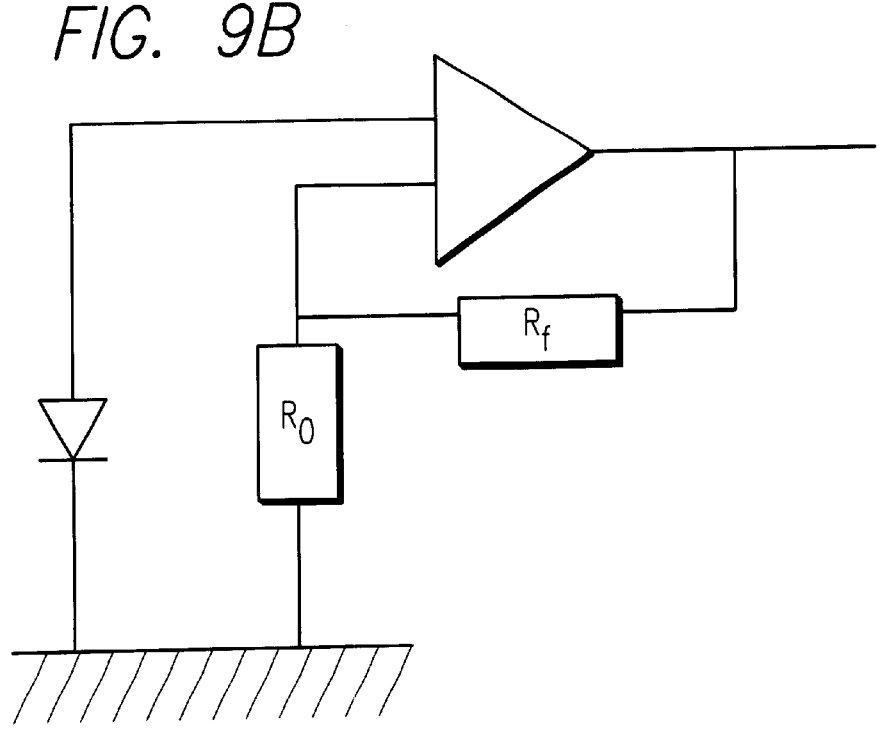
FIG. 9B is a circuit diagram of a thermal noise element in the form of a diode having a resistance value of $R_s$ and a noninverting amplifier connected thereto.
Figure 9C:
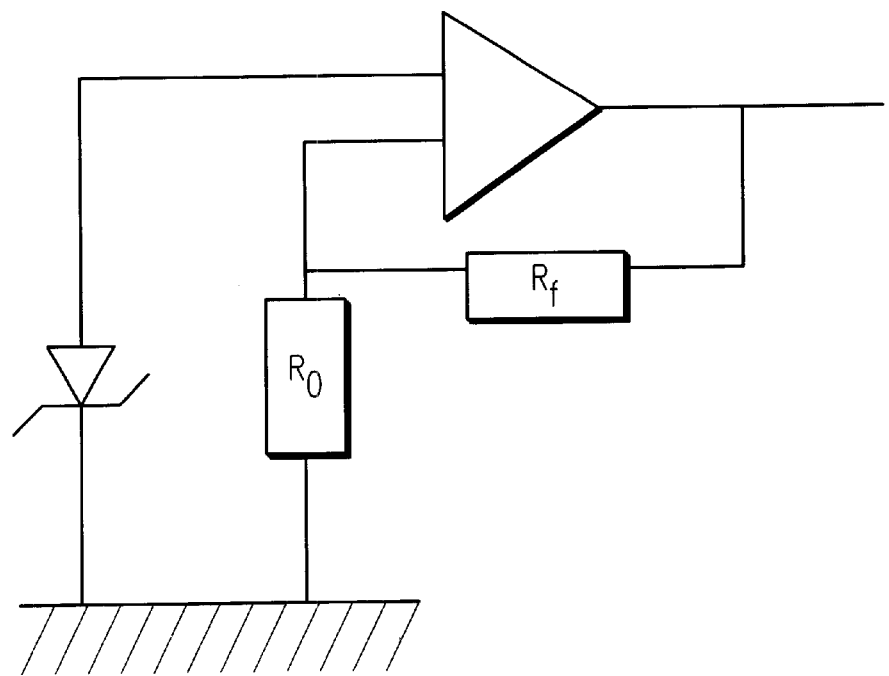
FIG. 9C is a circuit diagram of a thermal noise element in the form of a Zener diode having a resistance value of $R_s$ and a noninverting amplifier connected thereto.
Figure 9D:
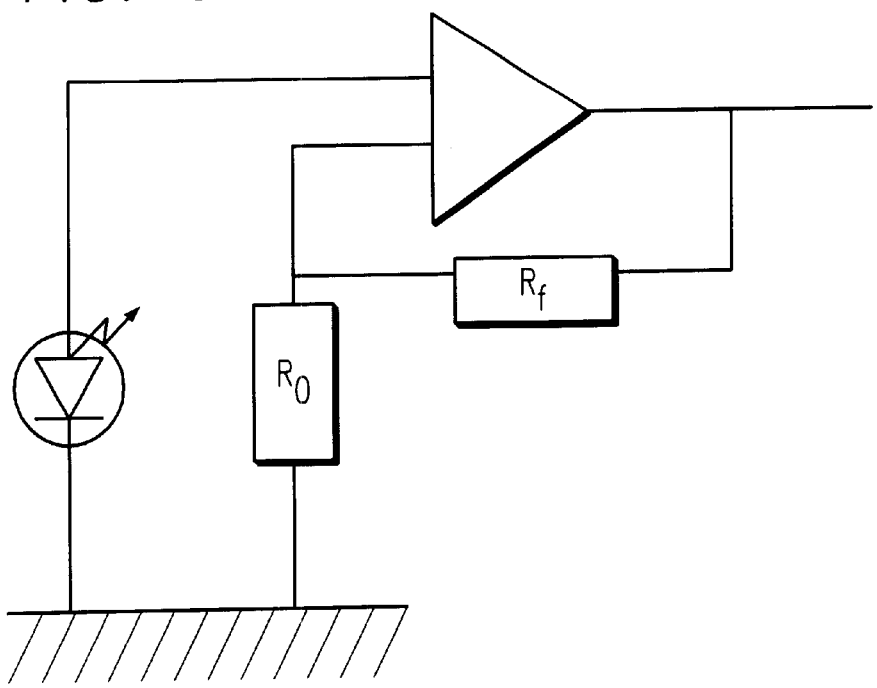
FIG. 9D is a circuit diagram of a thermal noise element in the form of a light-emitting diode (LED) having a resistance value of $R_s$ and a noninverting amplifier connected thereto
Figure 9E:
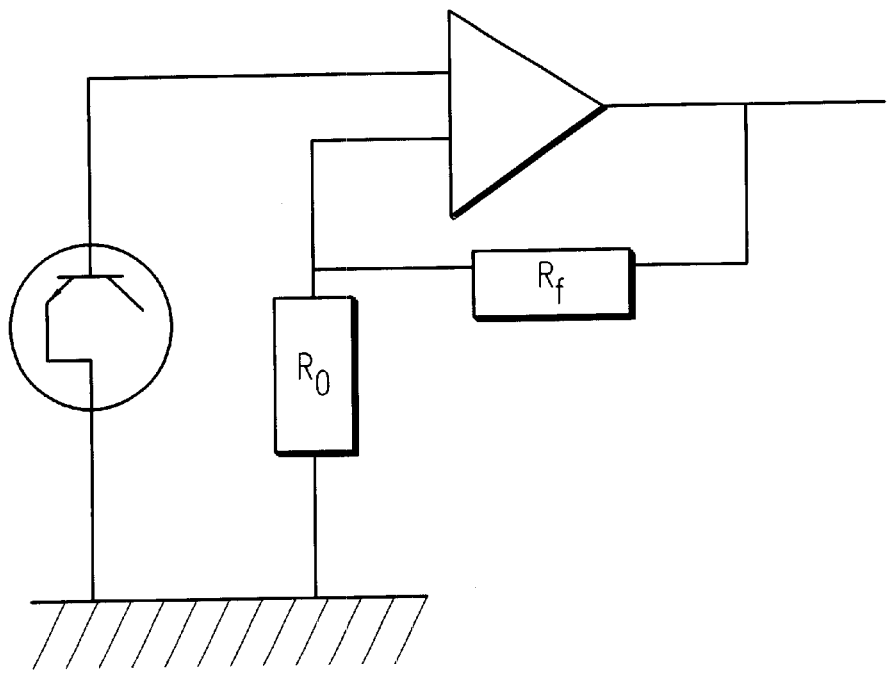
FIG. 9E is a circuit diagram of a thermal noise element in the form of a transistor having a resistance value of $R_s$ and a noninverting amplifier connected thereto.
Figure 9F:
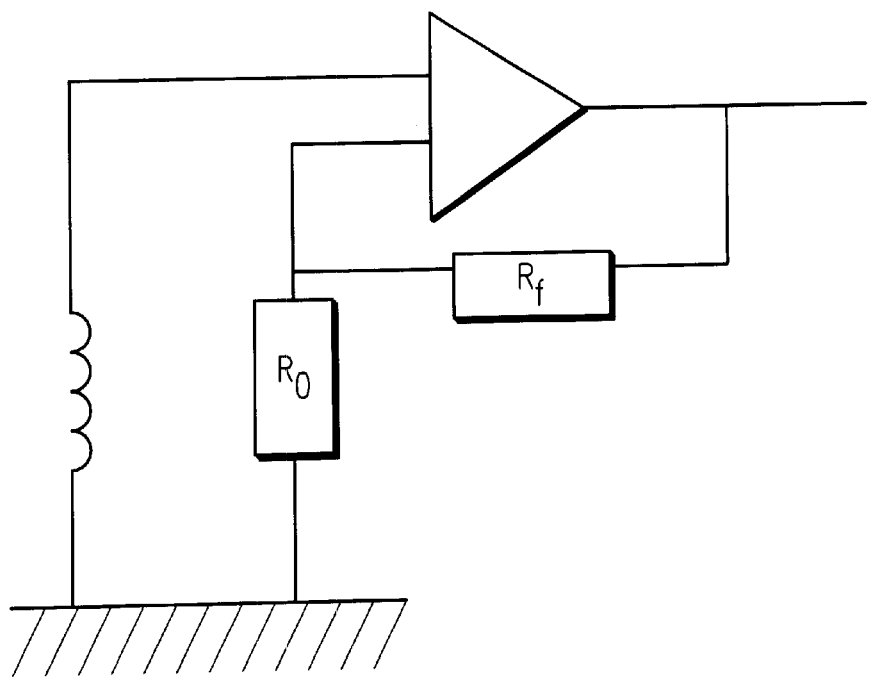
FIG. 9F is a circuit diagram of a thermal noise element in the form of an inductor having a resistance value of $R_s$ and a noninverting amplifier connected thereto.

FIG. 8 is a graph of the frequency distribution of the decimal random number of 0 through 9 obtained by using the embodiment of FIG. 7 that is adapted to take out the one digit number as random number. The FIG. 7 shows a uniform distribution pattern where 78,000 random numbers are distributed. In FIG. 8, mark I denotes the one standard deviation. Thus, non-uniformity of FIG. 8 represents the statistical fluctuations.

FIG. 9 is a schematic circuit diagram of a thermal noise generating element 2 showing a resistance value of R, and a non-inverting amplifier circuit connected to the element 2. When the amplifier circuit has resistors with resistance values of $R_0$ and $R_f$, the gain A of the amplifier circuit is expressed by formula 2 below.

$$\text{Gain: } A = R_f/R_0 \quad \text{(formula 2)}$$

Theoretically, random pulse signals are produced by amplifying the electromotive force from the thermal noise generating element having a resistance of $R_s$ by A (gain) times. However, it is not easy to obtain the theoretical value because the resistance $R_s$ of the thermal noise generating element 2 and the resistance $R_f$ of the amplifier circuit are mutually dependent Particularly, the noise generated from the amplifier contains the 1/f noises and other noises, because an electric current is supplied to the amplifier. Therefore, it is necessary to adjust the relationship between the resistance $R_s$ of the thermal noise generating element and the resistance $R_f$ of the amplifier circuit so that the noises of the amplifier circuit is negligible. The noises from the amplify mg circuit become remarkable and make it difficult to obtain uniform true random numbers if a large value is selected for the resistance R, in order to get a high potential from the thermal noise generating element 2 and/or for the resistance $R_f$ in order to get a large gain A, disregarding the necessary condition in the adjustment.

Figure 10:
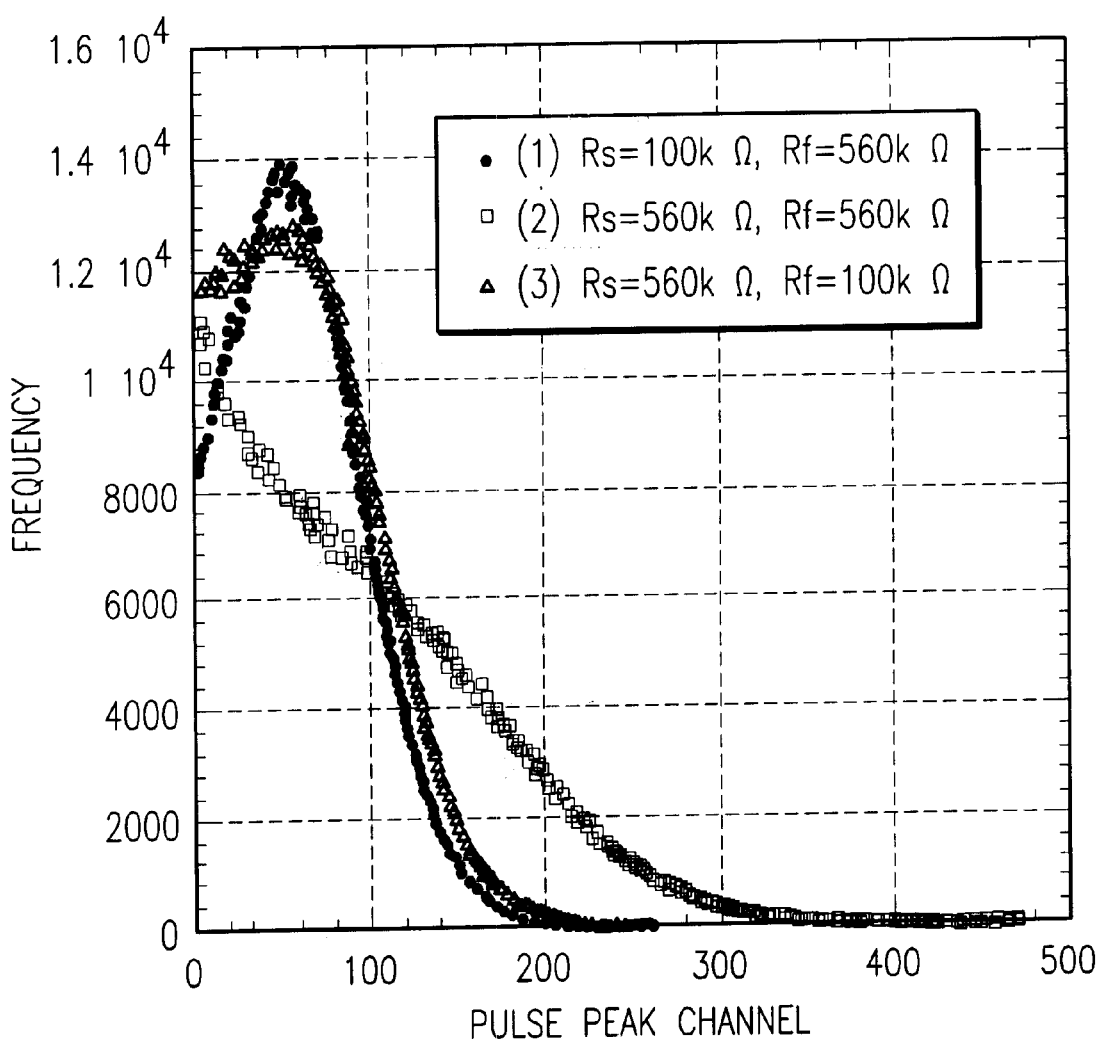
FIG. 10 is a graph showing the observed relationship between the pulse peak value and the frequency in the case of using the resistance value $R_s$ of the thermal noise element and the resistance value $R_f$ of the amplifier shown in the figure.

In view of this fact $R_s$=100 kΩ or 560 kΩ was selected for the resistance of the thermal noise generating element 2 while $R_f$=100 kΩ or 560 kΩ was selected for the resistance of the amplifier circuit and the pulse peak distribution was compared for each combination of the resistance values. In FIG. 10, (1) is the graph obtained for the combination of $R_s$=100 kΩ and $R_f$=560 kΩ and (2) is the graph obtained for the combination of $R_s$=560 kΩ and $R_f$=560kΩ, whereas (3) is the graph obtained for the combination of $R_s$=560 kΩ and $R_f$=100 kΩ. The pulse peak distributions of these three different combinations were obviously different from each other. The pulse peak distribution of thermal noises due to random thermal motions is a pseudo-Boltzmann distribution Eike (1), whereas (2) and (3) show pulse peak distributions that are totally different from the pseudo-Boltzmann distribution. From the above result, it is concluded that the primary requirement is $R_s < R_f$ in order to make negligible the contamination of the noises of the amplifier circuit.

Figure 11:
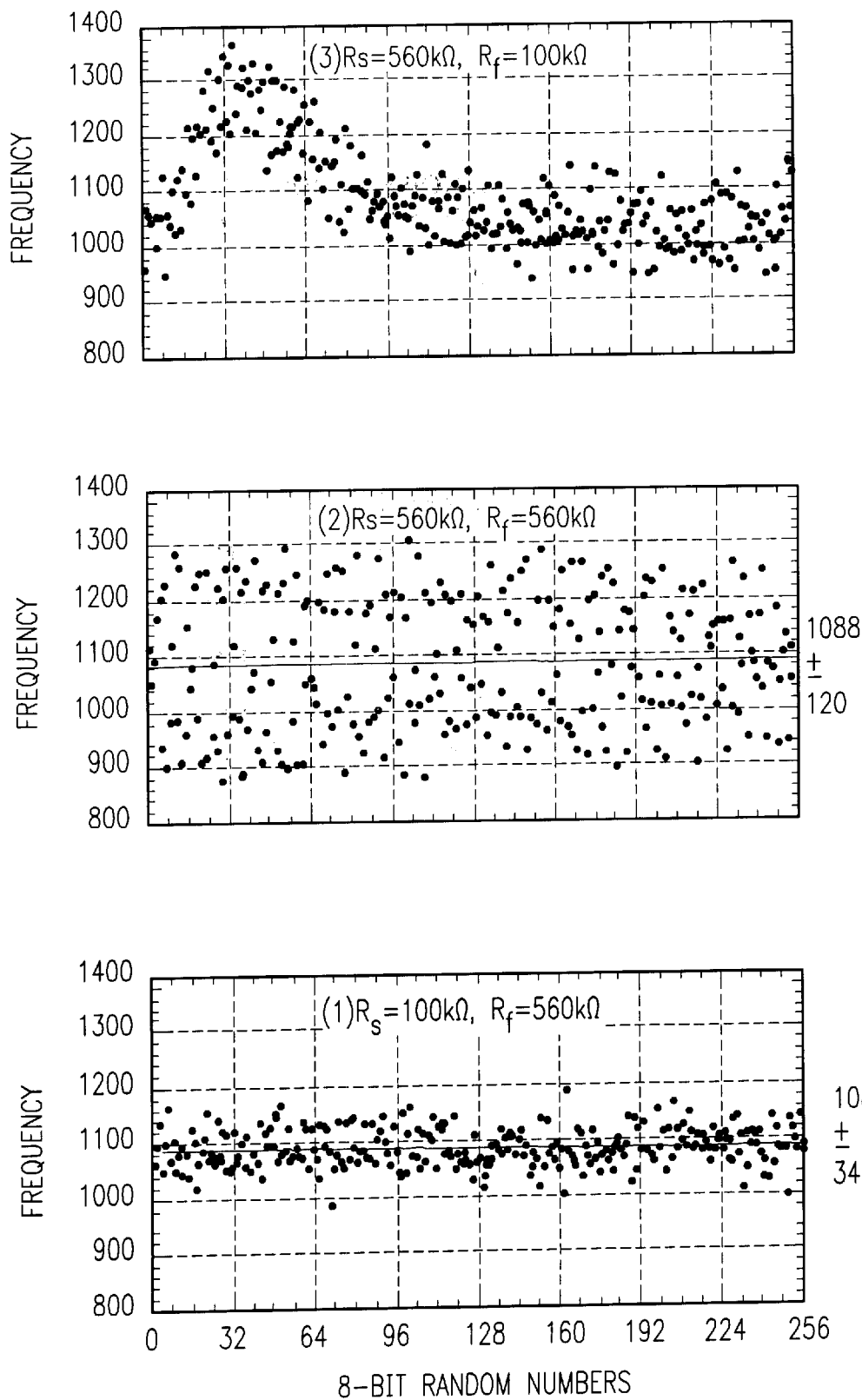
FIG. 11 is distribution graphs showing the relationship between the values of the 8 bit random numbers and the frequency of appearance thereof obtained when the resistance value $R_s$ of the thermal noise element and the resistance value $R_f$ of the amplifier are made to vary in the embodiment of FIG. 9.

FIG. 11 is distribution graphs showing the frequency distribution of the 8-bit random numbers each of the combinations of the resistance values described above. The frequency distribution of 8-bit random numbers is uniform for the combination of (1) with one standard deviation of ±34.5 to the average value of 1,088 which shows evidence of statistical fluctuations.

While the combination (2) satisfies the requirement of $R_s \leq R_f$, one standard deviation of ±120, exceeds far from the level of statistical fluctuations. The combination (3) of FIG. 10 deviate from the uniform distribution. Obviously, this is because the case of (3) shows a large influence of the noises from the resistance of $R_f$ of the amplifier circuit.

Figure 12:
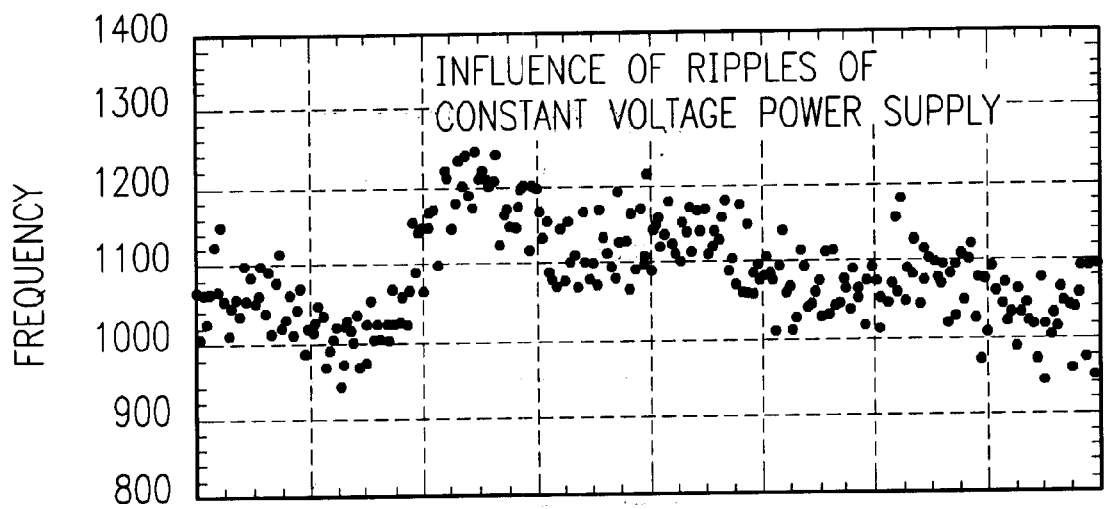
FIG. 12 is a distribution graph showing the relationship between the values of the random numbers and the frequency of appearance thereof obtained when a voltage is applied to the diode of the circuit of FIG. 9 from a constant voltage source or a battery.
Figure 12:
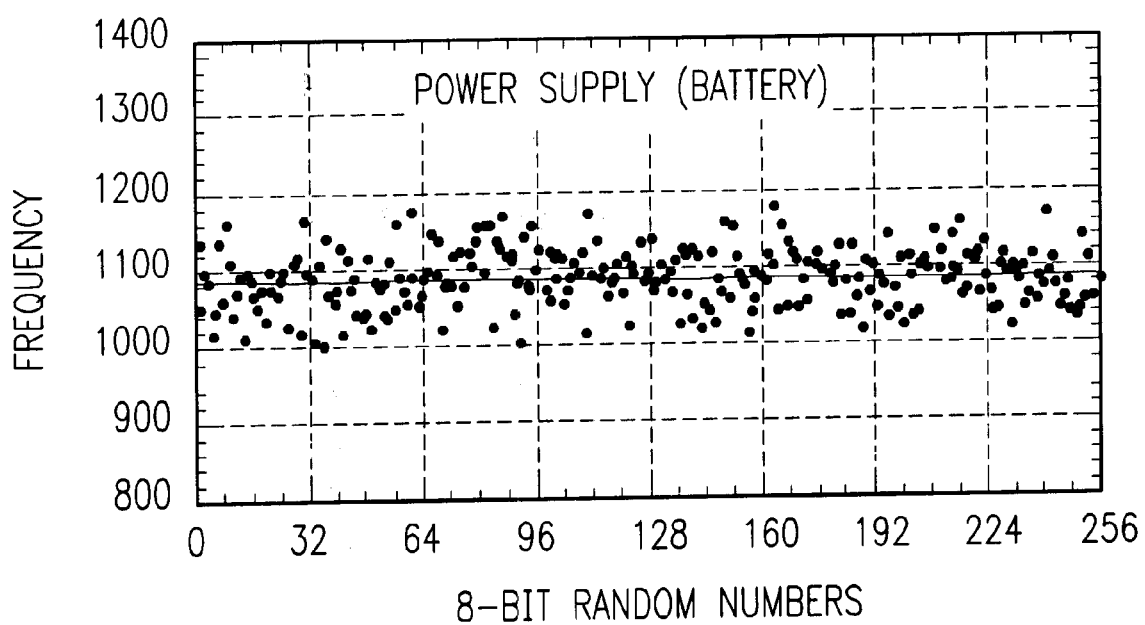

Generally, it is believed to be difficult to use white noises for random numbers because of the noises that enters from the power source. FIG. 12 is a distribution graph of the random numbers in which a photodiode is used as the thermal noise generating element 2 and an inverse voltage is supplied to the diode from a constant voltage supply or a battery in the circuit of FIG. 9 ($R_f$=100 kΩ).

It is obvious from the graph that the uniformity of random numbers is greatly disturbed by ripples of a constant voltage supply. On the other hand, the uniformity is retained in the case of a battery for supplying a voltage.

INDUSTRIAL APPLICABILITY

As describe above, in the random pulse generator and the thermal noise physical random number generator according to the invention, white noises generated from the thermal noise generating element can be used directly as random numbers without any modification because no electric current is supplied to the thermal noise generating element unlike completely conventional devices and hence they are not influenced by the ripples of the power supply and the external noise coming through the power supply line.

Additional, since the resistance value of the thermal noise generating element is selected so that the influence of the amplifier circuit become to be negligible, the true physical random numbers can be generated at a desired random number generating speed by selecting an appropriate threshold value although the random pulse generator and the thermal-noise physical random number generator have a very simple circuit configuration.

What is claimed is:

1. A random pulse generator comprising:
    a thermal noise generating element having a resistor, a conductor or a semiconductor such as a diode adapted to generate thermal noises without application of electric current thereto;
    an analog-amplifier circuit for amplifying the irregular electrical potential generated from the thermal noise generating element, the analog amplifier circuit coupled to and receiving thermal noises from the thermal noise generating element;
    a waveform shaping circuit adapted to take out and taking the output of the amplifier circuit as random rectangular pulse signals; and
    a pulse peak discriminator adapted to select the pulse peak value of a random pulse as threshold value is connected between the said amplifier circuit and the said waveform shaping circuit.

2. A random pulse generator according to claim 1, wherein
    the resistance value $R_s$ of resistor of the thermal noise generating element is selected less than the resistance value $R_f$ of resistor of the said amplifier circuit.

3. A thermal noise random number generator comprising:
    a thermal noise generating element 2 having a resistor, a conductor or a semiconductor such as a diode adapted to generate thermal noises without application of electric current thereto;

an analog-amplifier circuit for amplifying the irregular electrical potential generated from the thermal noise generating element, the analog amplifier circuit coupled to and receiving thermal noises from the thermal noise generating element;

a waveform shaping circuit 6 adapted to take out and taking the output of the amplifier circuit as random rectangular pulse signals; and an n-bit counter (n being an integer) for measuring the time interval between a random pulse signal output from the waveform shaping circuit 6 and the immediately succeeding random pulse signal, the n-bit counter coupled to and receiving output from the waveform shaping circuit;

said thermal noise random number generator being adapted to output the count of the n-bit counter as natural random number.

4. A thermal noise random number generator comprising:

a thermal noise generating element having a resistor, a conductor or a semiconductor such as a diode adapted to generate thermal noises without application of electric current thereto;

an analog-amplifier circuit for amplifying the irregular potential generated from the thermal noise generating element, the analog-amplifier circuit coupled to and receiving thermal noises from the thermal noise generating element; and a waveform shaping circuit 6 adapted to take out and taking the output of the amplifier circuit as random rectangular pulse signals;

the said thermal noise random number generator being adapted to count the number of pulses output from said waveform shaping circuit 6 in a predetermined time period and output the one-digit number or the several-digit number as random number.

5. A thermal noise random number generator according to claim 3 or 4, wherein the resistance value $R_s$ of resistor of the thermal noise generating element is selected less than the resistance value $R_f$ of the resistor of the said amplifier circuit.

6. A thermal noise random number generator according to claim 3 or 4, wherein a pulse peak discriminator 5 adapted to select the pulse peak value of a random pulse as threshold value is connected between the said amplifier circuit and the said waveform shaping circuit 6.

7. A thermal noise physical random number generator according to any of claim 3 through 6, wherein the thermal noise generator 2 that is a resistor or a diode is contained integrally with other circuits in an IC card or an IC chip provided with an information processing circuit and the information processing circuit are fed with physical random numbers for the purpose of personal identification, coding and other purposes in computer telecommunications or internet sales or for using it as probability generator in a game machine.

* * * * *